United States Patent
Oza et al.

(10) Patent No.: US 10,135,521 B2
(45) Date of Patent: Nov. 20, 2018

(54) SYSTEM AND METHOD OF PREDICTIVE SATELLITE SPOT BEAM SELECTION

(71) Applicant: Hughes Network Systems, LLC, Germantown, MD (US)

(72) Inventors: Rajeev Gautam Oza, Boyds, MD (US); Guy B. Montgomery, Potomac, MD (US); Peter Bradley Johns, Knoxville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/971,250

(22) Filed: Dec. 16, 2015

(65) Prior Publication Data

US 2017/0180038 A1 Jun. 22, 2017

(51) Int. Cl.
*H04B 7/185* (2006.01)
*H04B 7/06* (2006.01)
*H04W 4/021* (2018.01)

(52) U.S. Cl.
CPC ....... *H04B 7/18513* (2013.01); *H04B 7/0617* (2013.01); *H04W 4/021* (2013.01)

(58) Field of Classification Search
CPC .. H04B 7/18513; H04B 7/0617; H04W 4/021
See application file for complete search history.

(56) References Cited

U.S. PATENT DOCUMENTS

| | | |
|---|---|---|
| 5,574,968 A | 11/1996 | Olds et al. |
| 6,104,911 A | 8/2000 | Diekelman |
| 6,122,507 A | 9/2000 | Gerard et al. |
| 6,246,874 B1 * | 6/2001 | Voce .......... H04B 7/18541 455/13.1 |

(Continued)

FOREIGN PATENT DOCUMENTS

| | | |
|---|---|---|
| EP | 0637142 A1 | 2/1995 |
| EP | 0920143 A1 | 6/1999 |
| EP | 1764933 A1 | 3/2007 |

OTHER PUBLICATIONS

EPO, "Extended European Search Report & Written Opinion", EP15805999.8, dated Oct. 26, 2017.

(Continued)

*Primary Examiner* — Thai Nguyen
(74) *Attorney, Agent, or Firm* — Potomac Technology Law, LLC

(57) ABSTRACT

An embodiment of the present invention is a system to maximize efficiency as a mobile terminal receives data signals transmitted through multiple satellite spot beams. The multiple spot beams can be broadcast via a single satellite or multiple satellites. As a mobile terminal travels throughout a region, the system determines which spot beam would delivers data in the most efficient manner possible. This system takes into account multiple factors, including but not limited to velocity of the mobile terminal, traffic within a spot beam, business affiliations, etc. Once the system takes into account the various factors, an embodiment of the present invention generates a relative weighted factor that is subsequently associated with various available spot beams. Based on rankings of the weighted factors associated with each spot beam, the system may choose to receive data from a different spot beam.

2 Claims, 7 Drawing Sheets

(56) References Cited

U.S. PATENT DOCUMENTS

| | | |
|---|---|---|
| 6,609,002 B1 | 8/2003 | Krishnamurthy et al. |
| 8,326,217 B2 | 12/2012 | Wahlberg et al. |
| 8,743,722 B2 | 6/2014 | Miura |
| 9,681,337 B2 | 6/2017 | Davis et al. |
| 9,826,454 B2 | 11/2017 | Cili et al. |
| 2005/0053026 A1 | 3/2005 | Mullan et al. |
| 2005/0227631 A1 | 10/2005 | Robinett |
| 2006/0007863 A1 | 1/2006 | Naghian |
| 2008/0232258 A1 | 9/2008 | Larsson et al. |
| 2009/0092074 A1 | 4/2009 | Jamalipour et al. |
| 2010/0238853 A1 | 9/2010 | Zhou et al. |
| 2010/0246480 A1 | 9/2010 | Aggarwal et al. |
| 2010/0278141 A1 | 11/2010 | Choi-Grogan et al. |
| 2012/0028627 A1 | 2/2012 | Hunzinger |
| 2012/0131618 A1 | 5/2012 | Leater et al. |
| 2012/0133554 A1 | 5/2012 | Bromley et al. |
| 2013/0102309 A1 | 4/2013 | Chande et al. |
| 2013/0156008 A1 | 6/2013 | Dinan et al. |
| 2013/0225172 A1 | 8/2013 | Singh et al. |
| 2014/0314000 A1 | 10/2014 | Liu et al. |
| 2015/0063203 A1 | 3/2015 | Kim et al. |
| 2015/0109943 A1 | 4/2015 | Sahin et al. |
| 2015/0126193 A1 | 5/2015 | Huang et al. |
| 2015/0236781 A1 | 8/2015 | Jalali |
| 2015/0271730 A1 | 9/2015 | Benammar et al. |
| 2016/0233947 A1 | 8/2016 | Shen et al. |
| 2016/0360533 A1 | 12/2016 | Bennett et al. |
| 2017/0041830 A1* | 2/2017 | Davis ................ H04W 36/0005 |
| 2017/0064583 A1 | 3/2017 | Roy et al. |

OTHER PUBLICATIONS

US Patent Office, "PCT Search Report & Written Opinion", Application No. PCT/US2015/021377, dated Dec. 7, 2015.

* cited by examiner

SYSTEM AND METHOD OF PREDICTIVE SATELLITE SPOT BEAM SELECTION

FIELD OF THE INVENTION

An aspect of the present invention generally relates to the establishment of an internet connection, between a satellite terminal utilizing a satellite system broadcasting multiple spot beams that is in relative motion with respect to the satellite. Either the terminal, or the satellite or both may be in relative motion with respect to the earth. An embodiment of a mobile terminal or mobile satellite terminal is a terminal that is in relative motion with respect to the satellite. More particularly, the present invention relates to a system of efficiently transitioning a mobile terminal from satellite spot beam to another.

BACKGROUND OF INVENTION

The ability to maintain a constant TCP/IP connection during travel of a mobile terminal provides an enhanced user web browsing session. For example, a persistent connection ensures that a user may not have to login into a network multiple times during travel of a mobile terminal, e.g., an airplane, land vehicle, maritime ship etc. During a flight, an airplane network receiver can receive network data from multiple satellite spot beams. In conventional systems, satellites broadcasts multiple spot beams to mobile terminals to establish network connectivity. However, conventional systems lack the capability of maintaining end to end connectivity throughout movement of the terminal across different spot beams. More specifically, a TCP connection could be terminated each time an airplane moved from one satellite spot beam to another. As a result, interactive sessions between devices in use on an airplane and terrestrial servers, which are both connected via a common satellite, would be terminated. As an example, if a user is logged into a web site during the transition of the airplane receiver from one satellite spot beam to another, the user's connection will be terminated and will be required to reconnect.

Modern satellite systems have spot beams that are relatively small in diameter. Accordingly, mobile terminals travelling at high rates of speed with respect to the satellite can transition across an entire spot beam in a matter of minutes. A user would then be required re-login every few minutes, as the mobile terminal travels to its destination. Additionally, conventional satellite systems require temporary suspension of data packet transmission during the handover process between multiple satellite spot beams. This operation is inherently inefficient, as data packets are retransmitted to account for the time period that a physical satellite link being unavailable.

Accordingly, it is desired to develop a system that can prevent the loss of end to end connectivity as a terminal transitions from one satellite spot beam to another. Additionally, there is also a desire to intelligently select amongst multiple available satellite spot beams in a mobile terminal communication system. It would be beneficial to allow terminal users to continuously interact with a web location, as the terminal transitions from one spot beam to another, without having to re-login each time. Furthermore, it is advantageous to have a system that prevents loss of data packets during handover, as handover of a terminal occurs from one satellite spot beam to another.

As a mobile terminal moves out of the coverage area of one satellite, it may also be desired to transition from one satellite to another. Additionally, it would be advantageous to have a system in which a mobile terminal can efficiently select an appropriate satellite spot beam with a goal of minimizing unnecessary handovers as the mobile terminal travels. Accordingly, a beneficial design would allow for the mobile terminal to select the best possible satellite data beam based on an expected travel path, continually evaluate adjacent candidate beams and select an appropriate beam at the appropriate time, and prevent unnecessary switching between multiple satellite beams when traveling through an overlap of multiple satellite data beams.

SUMMARY OF INVENTION

System and method of a mobile terminal for improving for improving the transition among multiple satellite spot beams are described.

According to an exemplary aspect, a method of selecting a satellite spot beam for a mobile terminal is provided. The method comprises transmitting a signal to a satellite, establishing a connection with a gateway, wherein the gateway is selected based on the signal transmitted to the satellite, determining when the mobile terminal is approaching a boundary of the spot beam, transmitting a second signal to the satellite, wherein the second signal includes a message that the gateway should stop transmitting data and that a second gateway should start transmitting data to the mobile terminal, and establishing a connection with the second gateway.

DETAILED DESCRIPTION

Figure 1:
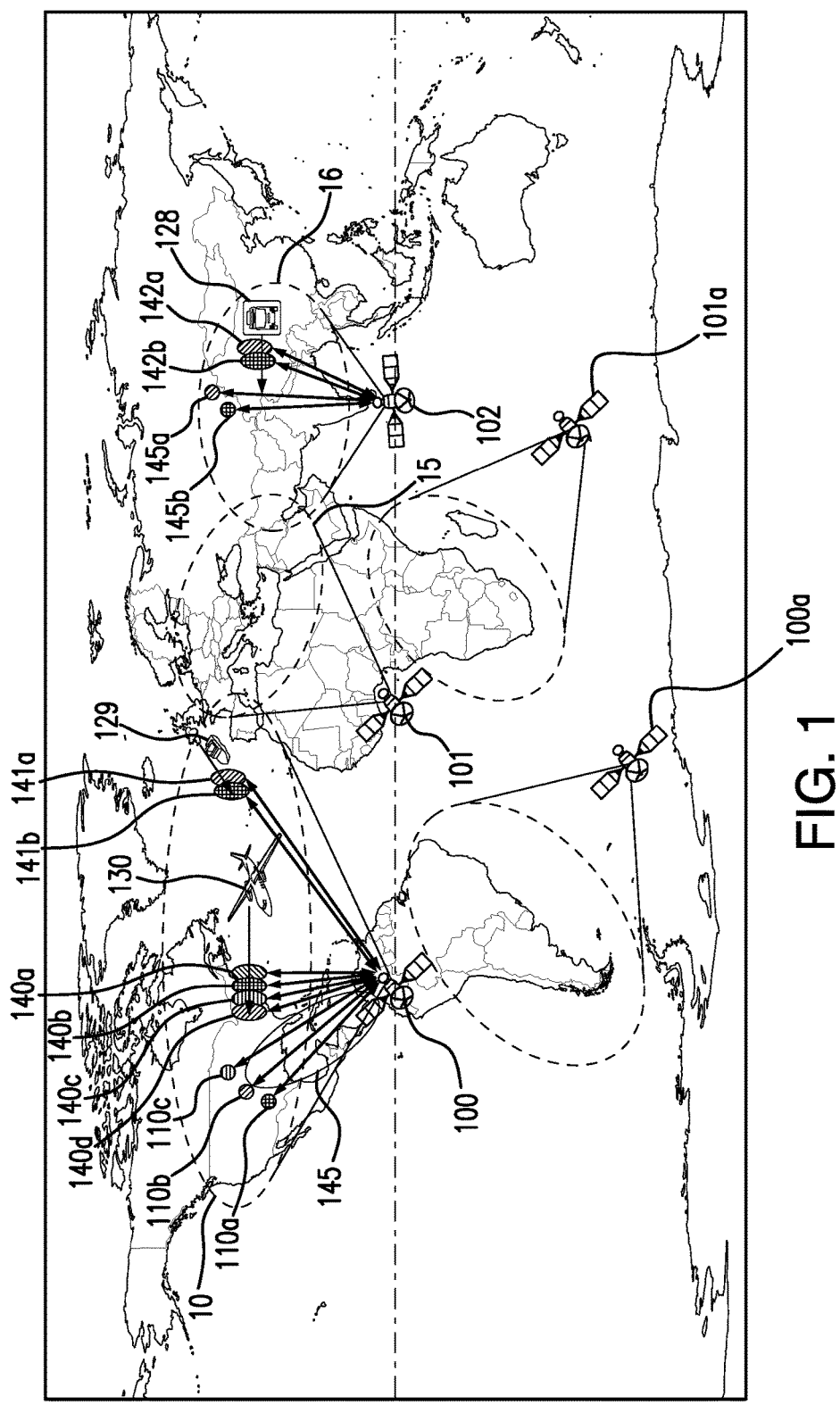
FIG. 1 shows a system according to an embodiment of the present invention.
Figure 2:
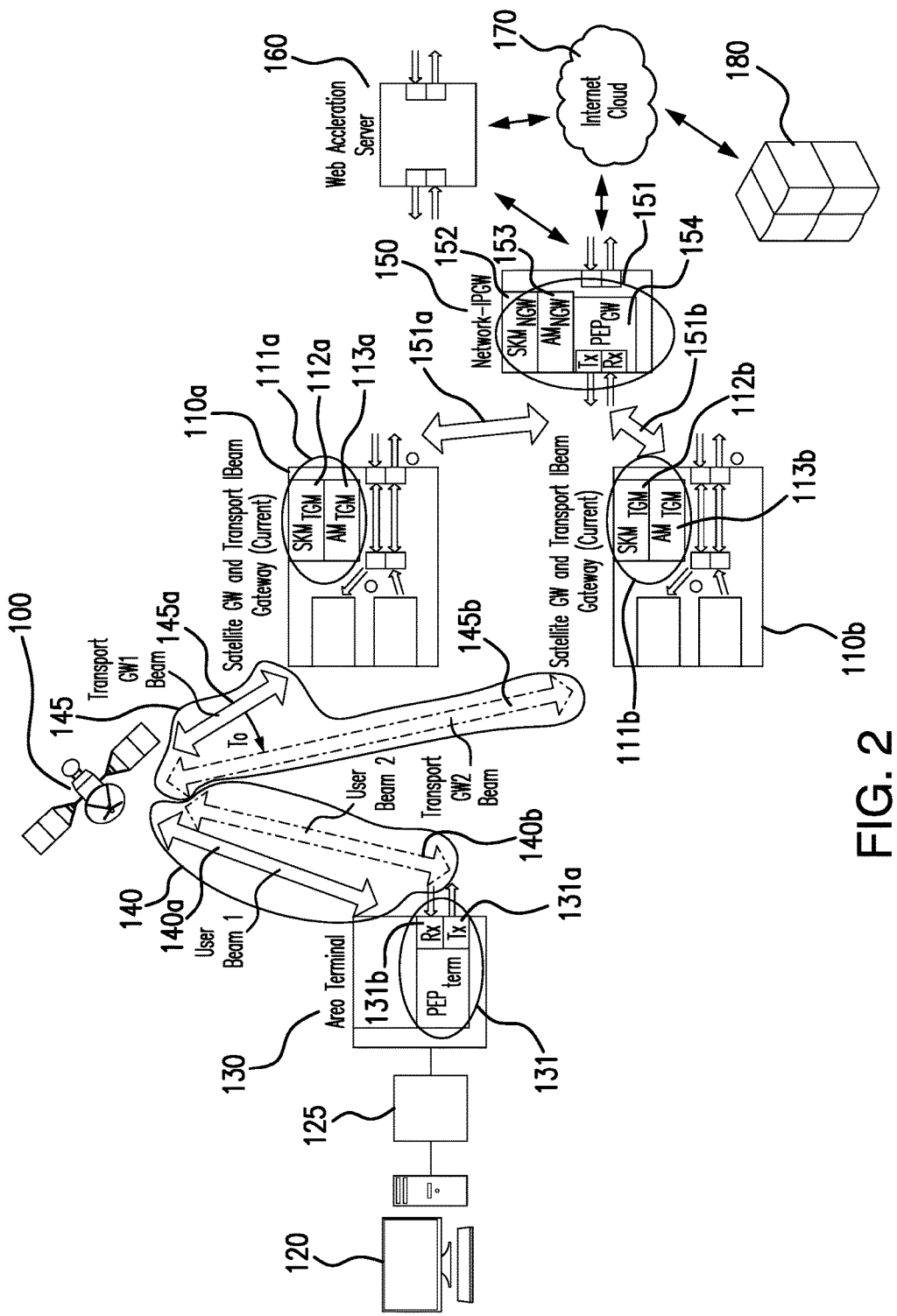
FIG. 2 shows a satellite spot beam switching process according to an embodiment of the invention.

FIG. 1 demonstrates an embodiment of the present invention. For example, mobile terminals may require data connectivity, throughout its travel. Data connectivity can be supplied via satellites 100, 101, and/or 102. The transmission area for each of satellites 100, 101, and 102 are divided into multiple sub-areas, which a signal or spot beam is transmitted from the respective satellite. For example, satellite 100 transmits data in spot beams 140*a*, 140*b*, 140*c*, 140*d*, 141*a*, and 141*b*. Satellite 102 transmits data in spot beams 142*a* and 142*b*. One of ordinary skill in the art would appreciate that the satellites 100, 101, and 102 are not limited to the spot beams depicted in FIG. 1; however, each satellite can service multiple spot beams in order to cover an entire coverage regions, 10, 15, and 16, respectively. As shown, satellites 100, 101, and 102 are embodied as geosynchronous or stationary satellites. However, it should be understood that alternative embodiments exists, including mobile satellites 100a and 101a. An embodiment of the present invention would function in a similar fashion utilizing geosynchronous or mobile satellites. Accordingly, as satellite 100a or 101a travels over various geographic locations, they will transmit data in multiple spot beams.

Data transmitted by satellites 100, 100a, 101, 101a and 102 via the various spot beams is provided by multiple terrestrial gateways. In a non-limiting embodiment, each gateway could provide data that is transmitted in an individual spot beam. For example, as illustrated in FIG. 1, gateway 110a serves (sends data to and receives data from) spotbeams 140b and 141b; gateway 110b serves spotbeams 140d, 140a and 141a; and gateway 110c would be responsible for spot beams 140c. For illustrative purposes, only a few spotbeams are shown. However, it should be understood that each satellite footprint 10, 15, 16 can be covered by one or more spot beams, such that all or a majority of the satellite foot print is covered. Each gateway can provide data for multiple spot beams. Similarly, satellite 102 transmits data that is provided by gateways 145a and 145b. Data transmitted in spot beams 142a and 142b is provided by gateways 145a and 145b, respectively.

The broadcast of multiple satellite spot beams are useful to provide a persistent network connection for mobile terminals. A mobile terminal can be any computing device capable of movement and receives data from a satellite. As a mobile terminal reaches the edge of a satellite spot beam, the mobile terminal determines if there is an available adjacent satellite spot beam to transition. Notably, multiple spot beams can be provided by a single satellite. Thus, as a mobile terminal transitions from one satellite spot beam to another, the transmitted data signal may emanate from a single satellite. However, a mobile terminal's path may cause it travel from the coverage area of one satellite to another. Thus, the mobile terminal may receive data transmissions from satellite spot beams transmitted from different satellites. A mobile terminal stores within its own memory the location of each satellite spot beam for a given geographic area. In this manner, as a mobile terminal senses the boundary of one spot beam, a signal is transmitted from the mobile terminal to the transmitting gateway via the associated satellite. The signal, which is subsequently transmitted to the controlling network access server, informs the network access server that it will soon be switching to another spot beam and gateway. The network access server transmits a signal to the gateway that is currently transmitting data informing it to stop transmitting data to the mobile terminal. The network access server transmits a second signal informing the adjacent gateway selected by the mobile terminal that it will soon be transmitting data to the mobile terminal. As the mobile terminal crosses the boundary from one spot beam to another, the mobile terminal tunes its frequency to that of the adjacent spot beam according to the parameters of the responsible gateway.

For example, satellite 100 broadcasts satellite spot beams 11, 12, 13, and 14, which could provide network connectivity during a mobile terminal's travel. As shown in FIG. 1, a non-limiting embodiment of the mobile terminal may be an in-flight aero terminal, e.g., an airplane, 130. Aero terminal 130 would have a receiver within the aircraft in order to receive the signal transmitted from satellite 100. Additionally, the receiver is capable of transmitting an internet request from an end user within aero terminal 130. In this instance, an end user could be a passenger on an airplane connecting to an internet website via a computing device 120. Computing device 120 could be embodied in various devices, including laptop computer, cellphone, PDA, tablet, etc. Typically, multiple computing devices 120 are centrally connected to aero terminal 130 via a wireless network router 125. However, one of ordinary skill in the art would understand that computing device 120 can be connected to aero terminal 130 in any number of ways, including a direct connection, e.g., Ethernet.

Aero terminal 130 includes a transceiver mechanism 131 that is used to receive a signal from a satellite. The transceiver 131 can be positioned to best receive a signal from a satellite beam. For example, as aero terminal 130 transitions into a satellite spot beam, the transceiver mechanism 131 is tuned to the appropriate frequency for that spot beam. Additionally, the antenna may be physically positioned to best receive the signal, as aero terminal 130 travels throughout the spot beam region. The physical position of the antenna mechanism can also be adjusted to best receive a signal from a different satellite, as the aero terminal travels into a different spot beam region.

Internet requests from are managed through multiple devices in order to provide a user with the requested information on aero terminal 130. For example, when a user, such as an airplane passenger, makes a request to view a web page from a computing device 120, the request is sent to satellite 100 via satellite spot beam 140. Once received by satellite 100, the request is transmitted such that internet server 180 provides a response.

Internet requests received by satellite 100 are transmitted to satellite gateways via satellite spot beams. In a non-limiting embodiment, satellite 100 transmits internet requests to satellite gateway terminal 110a via satellite spot beam 145. Satellite gateway 110a is connected to Network IP Gateway 150, which processes the request and transmits to internet cloud 170, i.e., a computing device infrastructure configured to receive and transmit requested internet data. The request can be directly transmitted to the internet cloud 170. Or, alternatively, the request may be transmitted to a web acceleration server 160 prior to being transmitted to internet cloud 170. Web acceleration server 160 may be used to reduce internet access time.

As aero terminal 130 travels from its departure to destination points, the transceiver mechanism 131 may communicate with multiple satellite spot beams. For example, aero terminal 130 can establish a connection with satellite spot beam 140a based on its location. In order to establish the connection, aero terminal 130 tunes its transceiver mechanism 131 to the out route carrier to which it is assigned in the satellite spot beam 140a. Specifically, aero terminal 130 receives information about the availability of in route data traffic within the satellite spot beam 140a and tunes transmitter 131a accordingly. This process allows aero terminal 130 to establish two-way communication with satellite gateway 110, which provides the data that is transmitted in satellite spot beam 140. Satellite 100 can also transmit data through multiple satellite spot beams. Accordingly, aero terminal 130 can travel through satellite spot beam 140a and reach boundary of its broadcast region. Upon reaching the boundary of satellite spot beam 140, aero terminal 130 can subsequently receive a broadcast signal through satellite spot beam 140b.

Once two-way communication has been established, aero terminal 130 analyzes the signal received in satellite spot beam 140a to determine the capabilities of satellite gateway 110 and the associated network IP gateway 150. In accordance with the determined capabilities of gateway 110 and network IP gateway 150, aero terminal 130 selects the appropriate satellite gateway and network IP gateway for a given geographic location, and notifies the selected satellite gateway. Satellite gateway 110 transmits a signal to affiliated network IP gateway 150, notifying it of the selection made by aero terminal 130. This synchronizes the connection between aero terminal 130, satellite gateway 110, and network IP gateway 150. The capability messaging includes IP addressing information for the Transport IP Gateways (111*a*, 111*b*), which may reside within satellite gateways 110*a* and 110*b*, respectively. The IP addressing information allows for the correct routing of network traffic. In order to route messages to and from the Internet server 180, aero terminal 130 listens for capability messages from the network IP gateway 151, which is associated with transport IP gateways (111*a*, 111*b*).

As aero terminal 130 travels, it may move through an entire coverage area of a satellite spot beam. For example, as aero terminal 130 travels it may reach the boundary of satellite spot beam 140*a* and into satellite spot beam 140*b*. When aero terminal 130 determines that a beam switch is necessary, aero terminal 130 sends a message to network IP gateway 150 via satellite gateway 110*a*. The message informs the network IP gateway 150 that a satellite spot beam switch is imminent and that network IP gateway 150 should stop sending and buffer data packets being transmitted via gateway 110. In order to switch from satellite spot beam 140*a* to 140*b*, aero terminal 130 tunes receiver portion 131*b* of transceiver mechanism 131 to an out route carrier that is assigned to the new satellite spot beam. The aero terminal 130 also receives information about the available in routes in the new spot beam, tunes transmitter 131*a* of transceiver mechanism 131 to use a new in route carrier. This establishes two-way communication with satellite gateway 110*b*, which transmits data in the newly selected satellite spot beam, e.g., spot beam 140*b*.

A mobile terminal may often select from multiple satellite spot beams. An aspect of the present invention is that aero terminal 130 can determine the most efficient path of spot beam coverage in relation to a mobile terminal's travel path. For example, the mobile terminal may invoke a process to adapt to a chosen spot beam selection. The spot beam adaptive algorithm may be invoked for at least the following reasons: predetermined timing mechanism, adaptable timing mechanism based on relative velocity of mobile terminal with respect to the satellite, proximity to the edge of beam, adaptable timing mechanism based on position of mobile terminal, or some combination thereof. Additionally, in the event that multiple satellites are available for to provide data transmission to a mobile terminal, the algorithm may consider relative work load of the satellites, quality of service available on each satellite, elevation angle with respect to the mobile terminal, azimuth angle with respect to the mobile terminal, predetermination of mobile terminal of a configuration preference for the satellite, or some weighted or unweighted combination thereof.

Figure 3:
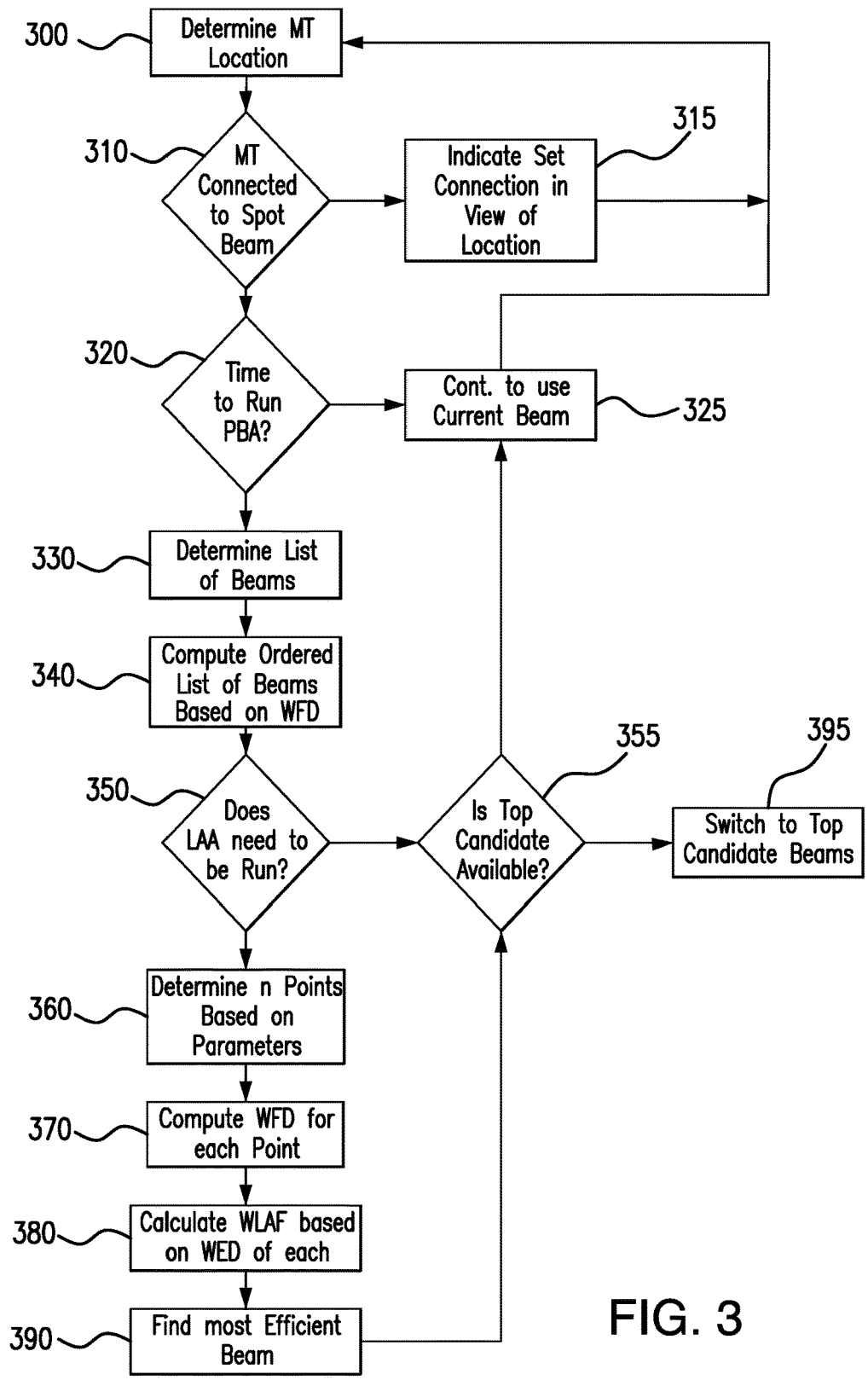
FIG. 3 shows the method of determining a beam switch according to an embodiment of the invention.

In exemplary, non-limiting embodiment, FIG. 3 demonstrates a satellite spot beam selection process by a mobile terminal. For example, the system will first make a determination of the location of the mobile terminal 300. At step 310, the system determines whether the mobile terminal is receiving a signal from a spot beam. If it is determined that the mobile terminal is not receiving a signal from a satellite spot beam, then the system initiates a connection sequence between the mobile terminal and the satellite broadcasting the satellite spot beam 315. However, if the mobile terminal is receiving a signal via a satellite spot beam, the system determines whether to invoke the subsystem 320, which periodically determines whether the current spot beam that is providing a signal to the mobile terminal is the best available. If it is not time to determine the best available satellite spot beam, the mobile terminal maintains its connection to the current satellite spot beam at step 325. Otherwise, the first step 330 in this process is to determine each of the spot beams broadcasting in the area of the mobile terminal. In order to make such a determination, the mobile terminal takes into account its own location and determines the available spot beams based on the geographic coordinates for each spot beam stored within the mobile terminal's memory. Next, the system determines the Weighted Fractional Distance (WFD), or distance between the mobile terminal and the location of strongest signal strength for each of the available satellite spot beam, 340. Other parameters can also be considered when ranking various satellite spot beams at multiple locations. For example, the traffic load of the spot beam and/or satellite, or business considerations may be considered to determine a combined weight value of the available satellite spot beams. Alternatively, the system can also take into consideration parameters such as business relationships, quality of service, relative work load of spot beams, angle with respect to the mobile terminal, azimuth angle with respect to the mobile terminal, predetermination of mobile terminal of a configuration preference for the satellite, etc.

At step 350, the system next determines whether to invoke the satellite spot beam look ahead subsystem. More specifically, under pre-determined conditions, the system will determine if the currently selected satellite spot beam is the most efficient choice based on its anticipated trajectory with respect to the satellite and other factors. The system may estimate the projected future path of the terminal for a time period based on a combination of factors. Those factors may include location, relative velocity and track angle of mobile terminal relative to the transmitting satellite, a pre-published and/or predetermined suggested travel path, and a recommended travel path based on GPS coordinates. If the mobile terminal is traveling above a predetermined speed, then the ordering of satellite spot beam mechanism within the system may be invoked. Advantageously, the speed threshold can help to prevent a mobile terminal from numerous transitions between multiple spot beams in an overlapping coverage area. Instead, mobile terminals traveling below a predetermined speed can maintain a connection to a satellite via a specific spot beam and only change to a different spot beam at the occurrence of a predetermined event. The predetermined event could be relative distance between the mobile terminal and the center of the spot beams in questions. In an exemplary embodiment, the satellite spot beam broadcast signal is typically strongest in the center of the spot beam. Accordingly, a feature of an embodiment of the present invention can account for the relative distance that a mobile terminal is from the center of overlapping satellite spot beams and switch to a different spot beam only when the difference between those relative distances goes beyond a predetermined percentage. In addition to speed of a mobile terminal, other parameters, e.g., data transmission strength, traffic load for a spot beam, etc., may be chosen in determining which of multiple spot beams to make a connection.

The ordering of multiple available satellite spot beams can account for multiple projected locations at various time intervals. For example, the system determines current and future locations of the mobile terminal based on various factors, including relative trajectory and speed of the mobile terminal with respect to the satellite per 360. For each location, the system next determines the WFD for each projected point, 370. The combined weight value is used to determine a Weighted Look Ahead Factor (WLAF), which ranks the candidate satellite spot beams accessible to the mobile terminal at each projected location 380. Based on the WLAF, the system determines the best available satellite spot beam that will minimize switching of satellite spot beams throughout the current projected trajectory of the mobile terminal 390. If the top ranked satellite spot beam is the same as the current beam, the system continues to use it. Otherwise, the system switches to the top ranked satellite spot beam.

Figure 4:
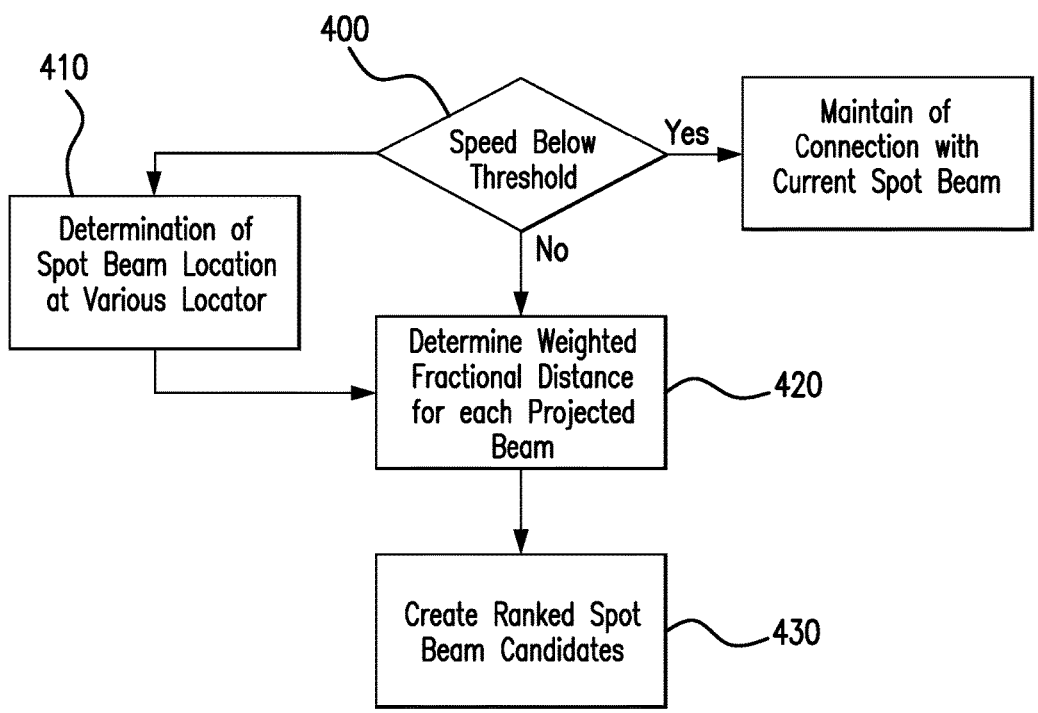
FIG. 4 shows the method of ranking multiple available spot beams according to an embodiment of the invention.

FIG. 4 demonstrates the occurrence of the ordering of upcoming satellite spot beams is invoked, which allows the system to rank the order of each of the upcoming candidate satellite spot beams. For example, the system may estimate the projected future path of the terminal for a time period based on a combination of factors. Those factors may include location, speed and track angle of mobile terminal relative to the transmitting satellite, a pre-published and/or predetermined suggested travel path, and/or a recommended travel path based on GPS coordinates. If the mobile terminal is traveling above a predetermined relative speed per 400, then the ordering of satellite spot beam mechanism within the system may be invoked. The ordering of multiple available satellite spot beams can account for multiple projected locations at various time intervals 410. For each of the projected locations, the system determines which satellite spot beam or beams are broadcasting. Next, the WFD, or distance between the mobile terminal and the location of strongest signal strength for each satellite spot beam, is calculated for each location 420. Other parameters can also be considered when ranking various satellite spot beams at multiple locations. For example, the traffic load of the spot beam and/or satellite, or business considerations may be considered to determine a combined weight value of multiple spot beams. The combined weight value is used to determine a WLAF, which ranks the candidate satellite spot beams accessible to the mobile terminal at each projected location 430.

Once the system has determined a final ranking of candidate satellite spot beams according to the WLAF 430, the mobile terminal uses those rankings to correspondingly register with the appropriate satellite and receive a broadcast signal from the identified satellite. If the first candidate from the ranked list of satellite spot beams is currently transmitting to the mobile terminal, no additional action is necessary. Otherwise, the mobile terminal attempts to establish connection to the next ranked candidate satellite spot beam. If unable to acquire in route and out route resources for a spot beam, the mobile terminal continues to establish a connection using each successive spot beam in the ranked list.

Figure 5A:
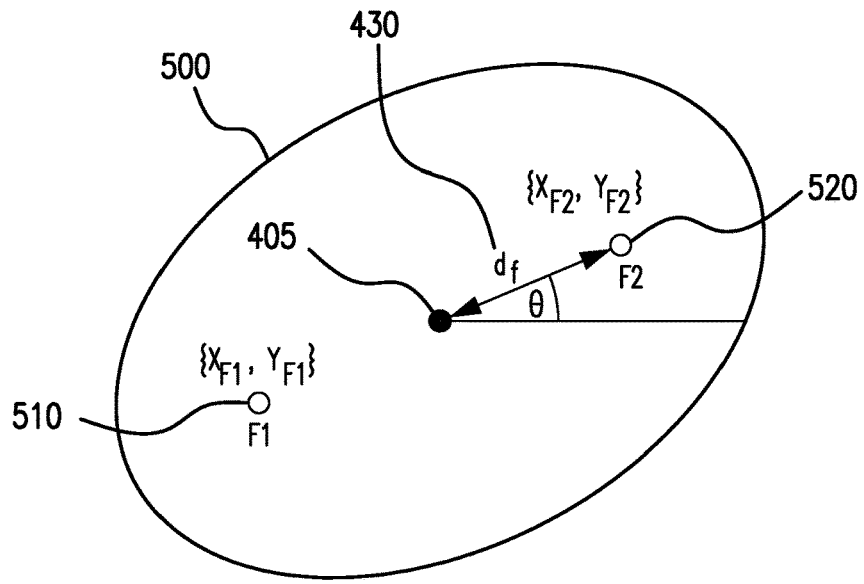
FIG. 5A shows an exemplary spot beam with elliptical geometry according to an embodiment of the invention.
Figure 5B:
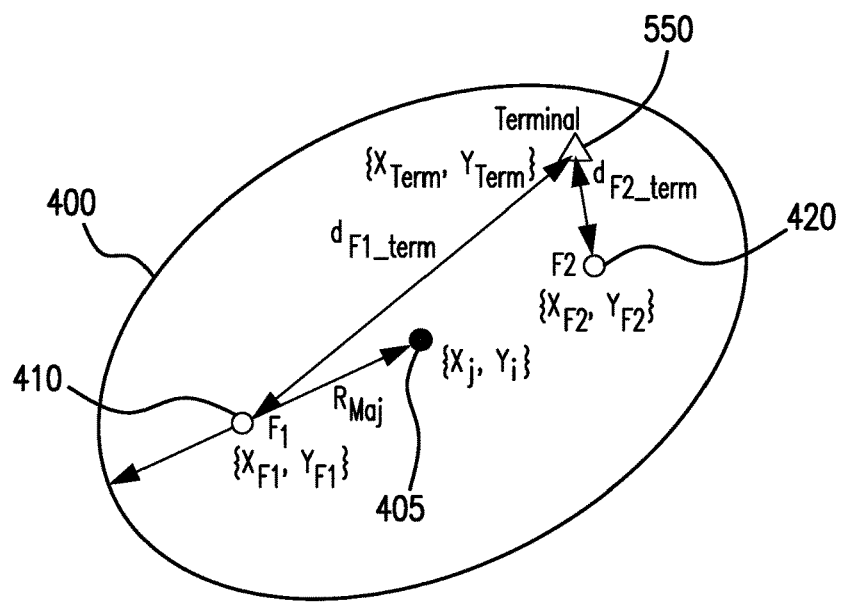
FIG. 5B shows an exemplary spot beam with elliptical geometry according to an embodiment of the invention.
Figure 6A:
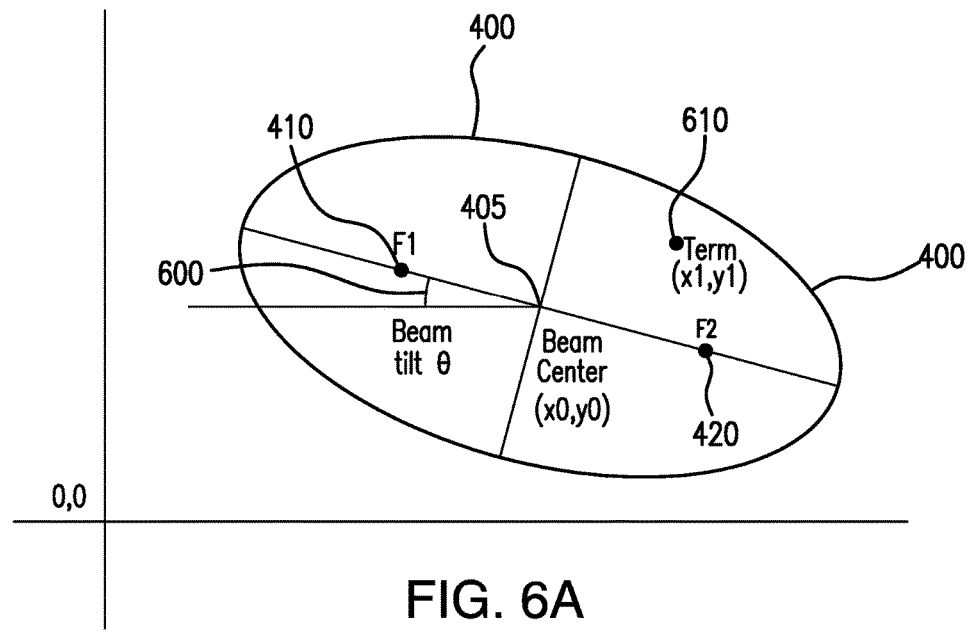
FIG. 6A shows geometric features of the elliptical spot beam according to an embodiment of the invention.
Figure 6B:
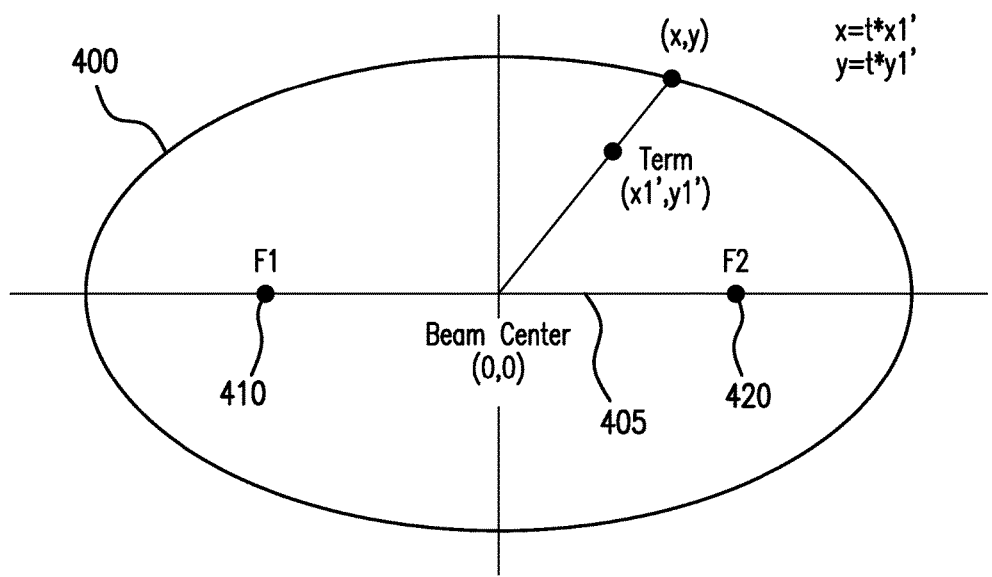
FIG. 6B shows geometric features of the elliptical spot beam according to an embodiment of the invention.

In an exemplary non-limiting embodiments, FIGS. 5A and 5B, demonstrate an aeronautical mobile terminal travels a path that encounters multiple satellite spot beams. The satellite spot beam 500 is defined as elliptical in shape. However, one of ordinary skill in the art would understand that a satellite spot beam can be defined as varying shapes. The mobile terminal will include computing devices including memory components that maintain location and identification data of each defined satellite spot beam.

Below is an exemplary lists of parameters that the look ahead portion of the algorithm could use in determining a ranking order of available satellite spot beams:

Constants:

| Parameter Name | Unit | Value | Description |
| --- | --- | --- | --- |
| $R_e$ | Meters | 6371000 | Mean radius of earth. |

Configuration Parameters:

| Parameter Name | Unit | Default | Min | Max | Description |
| --- | --- | --- | --- | --- | --- |
| NUM_LOOKAHEAD_POINTS | Number | 10 | 0 | 30 | Number of look-ahead points the algorithm should compute and evaluate during each invocation. 0 means no look-ahead - i.e. only use current location. |
| LOOKAHEAD_INTERVAL | Seconds | 30 | 1 | 100 | Seconds between consecutive look-ahead points. |
| BEAM_SELECTION_RUN_INTERVAL | Seconds | 10 | 1 | 100 | Interval at which to run beam selection algorithm. |
| MIN_VELOCITY | Meters/second | 45 | 0 | 300 | Minimum velocity, below which no look-ahead will be performed. |
| CURRENT_BEAM_PREF_WFD_BIAS | Number | 0.05 | 0 | 0.5 | This is how much any other beam WFD has to beat current beam WFD by in order to be selected over current beam. This helps prevent flip-flopping along the boundary and unnecessary handovers. |
| LOOKAHEAD_WFD_THRESHOLD | Number | 0.8 | 0.5 | 1.0 | When current beam's WFD goes higher than this threshold, look-ahead steps will be performed. |

Inputs:

| Parameter Name | Unit | Min | Max | Description |
|---|---|---|---|---|
| Latitude | Degrees | −90.0 | 90.0 | Floating point number in degrees where N is positive. This is received from AIRINC bus. |
| Longitude | Degrees | −180.0 | 180.0 | Floating point number in degrees where E is positive. This is received from AIRINC bus. |
| TrueTrackAngle | Degrees | 0 | 360 | True track angle with respect to true north. This is received from AIRINC bus. |
| GroundSpeed | Knots | 0 | 4096 | Ground speed in Knots. |

In this example, the spot beam selection algorithm makes the following assumptions:
All values are double precision float values
Antenna azimuth, elevation and tilt angles may be computed by an Antenna Control Unit (ACU)
The altitude of the mobile terminal may be considered for increased accuracy
The satellite spot beam algorithm uses the following factors:

$$\Psi = \frac{\pi}{180}.$$

TrueTrackAngle (degrees to radians conversion)
s=0.514444·GroundSpeed (knots to meters/second conversion)
Set j=0 (j keeps track of look-ahead iteration)
Select preferred satellite from the list available in the mobile terminal memory
CURRENT_BEAM set to the satellite spot beam currently broadcasting to the mobile terminal
The mobile terminal obtains longitudes of each satellite within network
Based on the terminal's location, e.g., longitude and latitude coordinates, and the actual satellite location obtained from the terminal's configuration file or satellite ephemeris data, the terminal computes an azimuth and elevation angle within the satellite coordinate system. The coordinates of the terminal are defined as $x_{Term}$ and $y_{Term}$.
The mobile terminal calculates the satellite spot beam center Az and El, collectively 500, which are based upon the Satellite Antenna Coordinates
Each spot beam is represented as an elliptical shape as follows:
  R_i,Maj=Satellite spot Beam i Major Axis Radius
  R_i,Min=Satellite Spot Beam i Minor Axis Radius
  $x_{i,F1}, y_{i,F1}$=First focus co-ordinates of ellipse i 510
  $x_{i,F2}, x_{i,F2}$=Second focus co-ordinates of ellipse i 520
  W_i,k=Satellite spot Beam i Weight with respect to k^th Neighbor Satellite spot Beam
The Mobile Terminal computes in the satellite antenna Az and El coordinates, 500, the distance between its location and the Satellite Spot Beam foci using the following equations.
Determine whether Mobile Terminal is within satellite spot beam contour
Mobile Terminal location is defined as:

$x_{Term}$=Terminal azimuth location $y_{Term}$=Terminal elevation location

Use Mobile Terminal & satellite spotbeam foci coordinates to calculate the following:

$d_{F1,Term}$=Distance from Mobile Terminal 550 to first focus 510

$$d1 = d_{F1,Term} = \sqrt{(x_{Term}-x_{F1})^2 + (y_{Term}-y_{F1})^2}$$

$d_{F2,Term}$=Distance from Mobile Terminal to second focus 420

$$d2 = d_{F2,Term} = \sqrt{(x_{Term}-x_{F2})^2 + (y_{Term}-y_{F2})^2}$$

Evaluate the following condition:
If (d1+d2≤2*$R_{maj}$) Then Mobile Terminal is contained by the Satellite spot Beam and is a candidate Satellite spot Beam. Note that only Satellite spot beams for the Mobile Terminal's NSP are listed in the system memory utilized by the Mobile Terminal so only that NSP's Satellite spot beams are potential candidates.
The Mobile Terminal discards the Satellite spot beams which do not satisfy the condition above and hence do not fall within the Satellite spot Beam's ellipse as specified by the algorithm. Otherwise the Mobile Terminal is outside the Satellite spot Beam and hence cannot receive. Let there be 'N' satellite spot Beams remaining.
If none (i.e., N=0) are found to contain the Mobile Terminal, the Mobile Terminal selects next satellite in the priority list and starts over looking for a beam in the new satellite by iterating the process, until last satellite defined in priority list.
If this is the last satellite in the priority list, stay with the current beam until next invocation of this algorithm. End of this run.
The Mobile Terminal rank-orders these N Satellite spot User Beams in terms of the weighted fractional distances (calculated as shown below), with the lowest having the highest rank. If there are ties, the Mobile Terminal breaks these ties by ordering them based the lower Satellite spot Beam ID with the lower Satellite spot User Beam ID having the highest rank.
This is unless the satellite spot beams have an identical Satellite Spot Beam Center but with opposite polarizations. In this special case, this algorithm defaults to selecting the right hand circular polarization (RHCP) if it is circular dual polarization (CP) or defaults to selecting the horizontal polarization (HP) if it is linear dual polarization (LP).
Calculate all Weighted Fractional Distance (WFD_i,k) for each candidate satellite spot beam with respect to its neighbor candidate satellite spot beams by following the steps below:
Denote the Satellite Spot Beam Center coordinates as (x0, y0)
Denote the terminal position coordinates as (x1, y1)
If a line is drawn through the spot beam center 405 and terminal location 610 then the points on the line can be expressed by the following equations $$x = x0 + (x1-x0)*t \qquad \text{Equation-1}$$

$$y = y0 + (y1-y0)*t \qquad \text{Equation-2}$$

in which t is a scalar multiplier used to describe the (x,y) in terms of the center and the terminal co-ordinates. Find satellite spot beam center (x0, y0) from the ellipse foci ($x_{F1}$, $y_{F1}$), ($x_{F2}$, $y_{F2}$).

$$x0 = \frac{xf1 + xf2}{2} \qquad \text{Equation-3}$$

-continued $$y0 = \frac{yf1 + yf2}{2} \quad \text{Equation-4}$$

If the terminal is located at spot beam center 405
a. go to step [0077]
b. Else if spot beam is a circle i.e. if $R_{maj}=R_{min}$.
  i. set $r=R_{maj}$, go to step [0076],
  ii. otherwise continue to [0073]
Find spot beam tilt angle, θ, 600, using one of the foci and spot beam center $$\Theta = \tan^{-1}\frac{(yf1-y0)}{(xf1-x0)}, \text{ where } \Theta \in [-\pi, \pi] \quad \text{Equation-5}$$

c. This can be calculated using the 'A tan 2' function in the math library

Translate the ellipse so that the spot beam center lies at origin (0, 0) and rotate it to align the major axis with the x axis. Let the new coordinates for the terminal and the spot beam center be (x1', y1') and (x0', y0') respectively, with x0'=y0'=0
If the tilt angle is +θ, the rotation has to be −θ

$$x1' = (x1-x0)*\cos(-\theta) - (y1-y0)*\sin(-\theta) \quad \text{Equation-6}$$
$$= (x1-x0)*\cos(\theta) + (y1-y0)*\sin(\theta)$$

$$y1' = (x1-x0)*\sin(-\theta) + (y1-y0)*\cos(-\theta) \quad \text{Equation-7}$$
$$= (y1-y0)*\cos(\theta) - (x1-x0)*\sin(\theta)$$

If (x,y) is the point on the ellipse where the line through the satellite spot beam center and terminal intersects the ellipse then, the fraction distance (FD) is the ratio of distance from center to terminal location (x1', y1') to the distance from center to (x, y).

$$FD_i = Dist(x1', y1')/Dist(x, y) = \sqrt{\left(\frac{x1'}{Rmaj}\right)^2 + \left(\frac{y1'}{Rmin}\right)^2} \quad \text{Equation-8}$$

Weighted Fractional Distance=WFD $$WFD_{ik} = \left(\sqrt{\left(\frac{x1'}{Rmaj}\right)^2 + \left(\frac{y1'}{Rmin}\right)^2}\right)^{W_{ik}} \quad \text{Equation-9}$$

Where $W_{ik}$ is Satellite Spot Beam i Weight with respect to k Neighbor Satellite Spot Beam. This step is repeated for all the neighboring satellite spot beams of satellite spot beam i that form the list from step [0051] above.
d. And go to step 1.1.1

$$\text{Set } WFD_{ik} = \left(\frac{\sqrt{(x1'^2) + (y1'^2)}}{r}\right)^{W_{ik}} \quad \text{Equation-10}$$

go to step 1.1.1 set $WFD_i = 0$ 1.1.1. Min($WFD_{ik}$) determines corresponding satellite spot beam i to be the selected satellite spot beam
  1.1.1.1. If Min($WFD_{ik}$) is exactly the same for two or more satellite spot beams
    1.1.1.1.1. then tie goes to satellite spot user beam with smallest satellite spot user beam id
1.1.2. Dual polarization causes a tie if the satellite spot user beam centers are exactly the same and are of opposite polarization. The parent User Beam for the selected Satellite spot User Beam becomes the selected User Beam. Even though dual polarization satellite spot user beams are not expected to be defined, if a dual polarization Satellite spot User Beam is selected then it defaults to selecting the right hand circular polarization (RHCP) if it is circular dual polarization (CP) or defaults to selecting the horizontal polarization (HP) if it is linear dual polarization (LP). For the expected case, if the parent User Beam is dual polarization but its defined Satellite spot Beam that has been selected is one polarization then the Satellite spot Beam's polarization becomes the selected polarization of the Satellite Spot Beam.
1.2. The previous two steps would result in N rank-ordered Satellite Spot Beams. The Mobile Terminal stores these Satellite Spot Beams in memory along with their polarization for the final User Beam selection. Let this list be denoted as $L_{j,k}$, where each list at $j^{th}$ iteration, has user beam list $B_{j,k}$, Polarization $Pol_{j,k}$, and weighted fractional distance $WFD_{j,k}$. So $B_{j,0}$, $B_{j,1}$ . . . $B_{j,k}$ denote the ranked user beams for the $j^{th}$ look ahead point starting at the current location represented by index j=0.
1.3. Find out if look-ahead algorithm should be invoked. If aircraft speed is below MIN_VELOCITY threshold, the aircraft is stationary, moving on the ground, in the process of landing or taking off. In those cases track-angle may be changing rapidly and prediction may not be valid. Also, in case where the terminal is close enough to the beam center, there is no need to consider beam handover.

```
1.3.1. If (j=0)
    1.3.1.1.        If (CURRENT_BEAM=0) /*power on case*/
        1.3.1.1.1.          If (s<MIN_VELOCITY)
            1.3.1.1.1.1.    Mobile Terminal selects B₀,₀ User Beam
            1.3.1.1.1.2.    Jump to step 1.7 and Pass L₀,ₖ to it
    1.3.1.2.        If (CURRENT_BEAM = B₀,₀)
        1.3.1.2.1.          If ( (WFD₀,₀< LOOKAHEAD_WFD_THRESHOLD) or (s<MIN_VELOCITY) )
            1.3.1.2.1.1.    End of this run.
    1.3.1.3.        If (CURRENT_BEAM <> B₀,₀)
        1.3.1.3.1.          If CURRENT_BEAM IS in L₀ list,
            1.3.1.3.1.1.    Let m be the index of CURRENT_BEAM in L₀ list
            1.3.1.3.1.2.    WFD_current=WFD₀,ₘ
        1.3.1.3.2.          Else   /* terminal woke up in different beam */
            1.3.1.3.2.1.    WFD_current=2  /* to force selection of B₀,₀ beam */
        1.3.1.3.3.          If ( [WFD_current − WFD₀,₀] < CURRENT_BEAM_PREF_WFD_BIAS)
            1.3.1.3.3.1.    End of this run.
```

```
    1.3.1.3.4.        Else
        1.3.1.3.4.1.    If (s<MIN_VELOCITY)
            1.3.1.3.4.1.1.    Mobile Terminal selects B_{0,0} User Beam
            1.3.1.3.4.1.2.    Jump to step 5.14 and pass L_{0,k} to it
```

Figure 7:
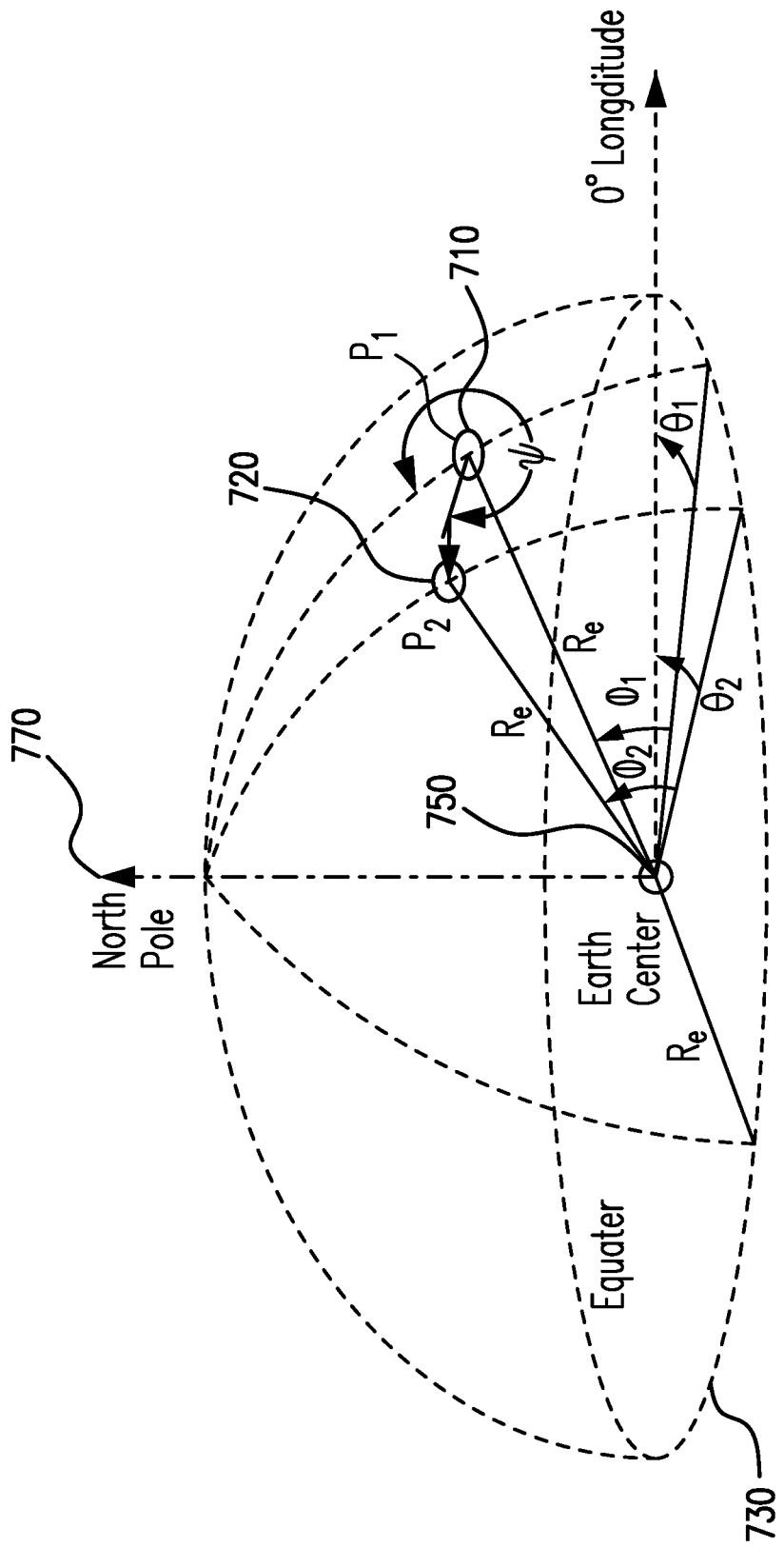
FIG. 7 shows geometric features of movement of terminal in a great circle arc for spot beam look ahead algorithm according to an embodiment of the invention.

1.4. Look-ahead is required. Increment j by 1.
1.5. In FIG. 7, $P_1$ denotes the current location of Mobile terminal and $P_2$ denotes $j^{th}$ look ahead point.
   1.5.1. If (j>NUM_LOOKAHEAD_POINTS) go to step 1.6
   1.5.2. Find $j^{th}$ look ahead point using following formulae:
To calculate latitude of the new point $P_2$ at $j^{th}$ look-ahead point after t seconds:

$$\varphi_2 = \sin^{-1}\left(\sin\varphi_1 \cdot \cos\left(\frac{s \cdot t}{R_e}\right) + \cos\varphi_1 \cdot \sin\left(\frac{s \cdot t}{R_e}\right) \cdot \cos\Psi\right) \quad \text{Equation-11}$$

And to calculate longitude of the new point $P_2$ at $j^{th}$ look-ahead point after t seconds:

$$\theta_2 = \theta_1 + \tan^{-1}\left(\frac{\sin\Psi \cdot \cos\varphi_1 \cdot \sin\left(\frac{s \cdot t}{R_e}\right)}{\cos\left(\frac{s \cdot t}{R_e}\right) - \sin\varphi_1 \cdot \sin\varphi_2}\right) \quad \text{Equation-12}$$

Where, t=j·LOOKAHEAD_INTERVAL
Jump to step 1.5.1 above supplying $(\varphi_2, \theta_2)$ as latitude and longitude.
1.6. To pick the best beam considering look-ahead results, calculate Weighted Look-ahead Factor (WLAF) for each beam in $L_0$ list as follows:

```
1.6.1. Initialize
    1.6.1.1.        WLAF_i = 0;
1.6.2. For each of the i beams B_{0,i} in L_0 list:
    1.6.2.1.        For j in 1.. NUM_LOOKAHEAD_POINTS :
        1.6.2.1.1.        If B_{0,i} is not in L_j, WFD=1
        1.6.2.1.2.        Else WFD = WFD of beam B_{0,i} in L_j list
        1.6.2.1.3.        WLAF_i += power(WFD, j)
```

1.6.3. Generate sorted list of i triplets $(SB_i, Pol_i, WLAF_i)$ for beams in $L_0$ list, sorted by ascending values of WLAFs, where SB values are corresponding user beams in $L_0$ list and $Pol_i$ their polarization;
1.7. Mobile Terminal tries to lock onto the outroute frequency defined in the Mobile Terminal configuration for the top choice in the list passed from step 1.6.3 or step 1.3. The configuration file contains the following outroute information:
   1.7.1. Outroute frequency center (MHz)
   1.7.2. Outroute symbol rate (Msps)
   1.7.3. Outroute type (Wideband or Broadband) which must match the Mobile Terminal's capability in order to be considered by the Mobile Terminal
1.8. In following cases, Mobile Terminal should try other beams in the order from the list of SBs from step 1.6.3 or step 1.3, and if none of them work, Mobile Terminal should pick next satellite from the prioritized list from the mobile terminal's system memory and run the algorithm from the beginning for that satellite:
   1.8.1. If the all the outroutes of selected beam are disabled. The outroute "enabling/disabling" information is contained in system info messages. It is available only after the Mobile Terminal can actually receive system information transmissions from the satellite.
   1.8.2. If the Mobile Terminal is not be able to receive on any of the frequencies listed in its system memory for the selected User Beam for the selected polarization from its shortlist.
   1.8.3. If the User Beam ID received in the system information for the current User Beam does not match the expected User Beam. This is necessary because, under rare scenarios, the Mobile Terminal might actually be listening on the same frequency from a nearby User Beam.
1.9. If different satellite is chosen, ACU needs to be commanded to point to that new satellite. Ranging will have to be done over that link.

The above-described features may be implemented in combination with each other to provide various exemplary embodiments in accordance with the invention.

Although the invention has been described and illustrated in the foregoing illustrative embodiments, it is understood that the present disclosure has been made only way of example, and that numerous changes in the details of implementation of the invention can be made without departing from the spirit and scope of the invention, which is limited only by the claims that follow. Features of the disclosed embodiments can be combined and rearranged in various ways within the scope of and spirit of the invention.

What is claimed is:

1. A method of selecting a satellite spot beam for a mobile terminal comprising:
establishing, by the mobile terminal, a connection with a network gateway via a first satellite spot beam, which depends on a proximity of the first spot beam to the mobile terminal, and a respective first satellite gateway;
determining, by the mobile terminal, that it is approaching a boundary of the first spot beam;
transmitting, by the mobile terminal, a message to the network gateway, via the connection, signaling an upcoming handoff of the connection from the first satellite spot beam and the first satellite gateway to a second satellite spot beam and a respective second satellite gateway;
transmitting, by the network gateway, a message to the first satellite gateway signaling that the first satellite gateway should stop transmitting data to the mobile terminal via the connection, and a message to the second satellite gateway signaling that the second satellite gateway should start transmitting the data to the mobile terminal; and
establishing, by the mobile terminal, the connection with the network gateway via the second satellite spot beam and the second satellite gateway.

2. A mobile satellite system comprising:
one or more satellites;
a plurality of satellite gateways;
one or more network gateways; and
one or more mobile terminals; and
wherein at least one of the mobile terminals is configured to (i) establish a connection with a one of the one or more network gateways via a first satellite spot beam, which depends on a proximity of the first spot beam to the mobile terminal, and a respective first one of the satellite gateways, (ii) transmit and receive inroute and outroute data, respectively, to and from at least one of the one or more satellites via the connection, (iii) determine that the mobile terminal is approaching a boundary of the first satellite spot beam, (iv) transmit a message to the one network gateway, via the connection, signaling an upcoming handoff of the connection from the first satellite spot beam and the first satellite gateway to a second satellite spot beam and a respective second one of the satellite gateways, and (v) establish the connection with the one network gateway via the second satellite spot beam and the second satellite gateway, and wherein the one network gateway is configured to transmit a message to the first satellite gateway signaling that the first satellite gateway should stop transmitting the outroute data to the one mobile terminal via the connection, and a message to the second satellite gateway signaling that the second satellite gateway should start transmitting the outroute data to the one mobile terminal.

* * * * *